W. BUNCE.

Improvement in Compression-Clasps for Elastic Tubes.

No. 5,113. Reissued Oct. 29, 1872.

WITNESSES:

Th. L. H. Beck.

Wm. G. Henderson

INVENTOR:

William Bunce by his atty.

W. Salade

AM. PHOTO-LITHOGRAPHIC CO. N.Y. (OSBORNE'S PROCESS.)

UNITED STATES PATENT OFFICE.

WILLIAM BUNCE, OF OBERLIN, OHIO, ASSIGNOR OF ONE-HALF INTEREST TO E. A. DAY, OF SAME PLACE.

IMPROVEMENT IN COMPRESSION-CLASPS FOR ELASTIC TUBES.

Specification forming part of Letters Patent No. 113,016, dated March 28, 1871; reissue No. 5,113, dated October 29, 1872.

*To all whom it may concern:*

Be it known that I, WILLIAM BUNCE, of Oberlin, in the county of Lorain and State of Ohio, have invented certain Improvements in a Clasp or Valve for regulating the flow of fluid through an elastic or flexible tube or pipe, of which the following is a specification:

My invention consists in a clasp so formed that its application to a rubber or any elastic tube or pipe will regulate the flow of any fluid passing through the same—that is, by operating this clasp by the hand or otherwise the fluid is permitted to flow, but when not so acted upon it is self-acting upon the tube or pipe and stops the flow of the fluid through the same; and I contemplate using this clasp for all purposes where the same is practicable, such as regulating the flow of water through a hose-pipe when used for any purpose whatever, where such a clasp may be used for regulating the flow of fluids through such tube or pipe, and the same is equally valuable in connection with the ends of elastic tubes to "fountain syringes," used in surgery. I further contemplate manufacturing the said clasp in a variety of different sizes to adapt them to the various purposes for which they are needed, as well as in a variety of style and finish to suit the fancy of the manufacturer.

Figure 1:
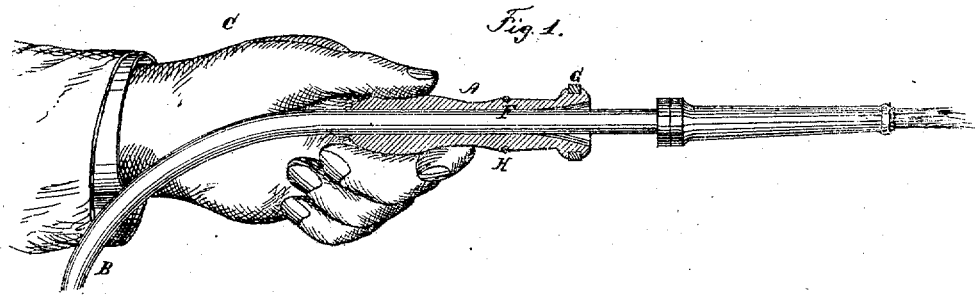
Figure 2:
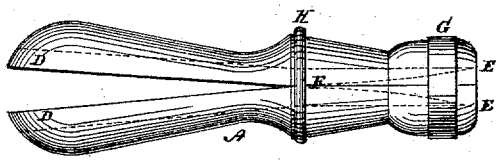
Figure 3:
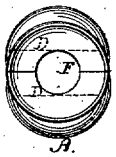

In the drawing, Figure 1 is a sectional view of the clasp when attached to the tube or pipe, showing the different parts of the same; and Figs. 2 and 3 represent a side and end view, respectively, of the same.

*General Description.*

A is the clasp. This clasp may be formed of wood, metal, or vulcanized rubber, and is made round or of any other convenient form, and of sufficient size to admit of a circular aperture in the center of suitable diameter to inclose the elastic tube or pipe B, Fig. 1, which it is intended to clasp. The clasp thus formed is divided lengthwise through the center, making two parts or halves. These halves are beveled or chamfered off from the middle toward the ends, as at D and E, Fig. 2, leaving a central fulcrum or pivot-joint at or near the middle, as at F, Fig. 1. They are then placed with their internal surfaces together, surrounding the tube and resting upon the pivot-joint or fulcrum, as seen in Fig. 1. This fulcrum or pivot-joint F may be formed in any manner best adapted to the purpose. Around the outer end of the clasp is placed an elastic band, as at G, Figs. 1 and 2. This band acts as a spring and forces the ends of the halves of the clasp close together upon the tube B, Fig. 1, thus closing this end tight upon the tube and preventing the passage of any fluid through the same, and at the same time, by means of the fulcrum F, opening the opposite ends of the clasp by pressing these latter ends together with the hands or otherwise, as at C, Fig. 1, the ends surrounded by the spring or elastic band G are thrown open, permitting the immediate flow of the fluid. By releasing this pressure the opposite ends of the clasp close upon the tube or pipe, thus adjusting the flow of the fluid as the pressure is released or applied.

It will be understood that other and metallic springs may be substituted for the elastic band G shown in the drawing, and answer equally well; but for all practical purposes I prefer the rubber band to that of any other form of spring that might be employed for this purpose.

What I claim as my improvement in compression-taps for elastic tubes is—

The hollow clasp described, formed in halves, with a central fulcrum or pivot-joint, F, and provided with an elastic spring, G, substantially as and for the purpose set forth.

In testimony that I claim the within and above described invention I hereunto subscribe my name on this the 4th day of September, 1872.

WM. BUNCE.

Witnesses:
C. W. SALADEE,
E. A. DAY.